US012379735B2

(12) United States Patent
Huang et al.

(10) Patent No.: US 12,379,735 B2
(45) Date of Patent: Aug. 5, 2025

(54) REFERENCE VOLTAGE AUTO-SWITCHING MECHANISM USED IN REGULATOR FOR SAVING MORE POWER IN LOW-POWER MODE

(71) Applicant: MEDIATEK INC., Hsin-Chu (TW)

(72) Inventors: Chih-Chien Huang, Hsinchu (TW); Chuan-Chang Lee, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 176 days.

(21) Appl. No.: 18/072,724

(22) Filed: Dec. 1, 2022

(65) Prior Publication Data

US 2023/0266781 A1 Aug. 24, 2023

Related U.S. Application Data

(60) Provisional application No. 63/313,301, filed on Feb. 24, 2022, provisional application No. 63/344,078, filed on May 20, 2022.

(51) Int. Cl.
*G05F 1/46* (2006.01)
*G06F 1/3296* (2019.01)

(52) U.S. Cl.
CPC ............ *G05F 1/468* (2013.01); *G06F 1/3296* (2013.01)

(58) Field of Classification Search
CPC .......... G05F 1/468; G05F 1/562; G05F 1/563; G05F 1/46; G05F 1/461; G05F 1/462; G05F 1/465; G05F 1/467; G05F 1/3296
See application file for complete search history.

(56) References Cited

U.S. PATENT DOCUMENTS

| 7,880,446 B2 | 2/2011 | Chen |
| 8,901,907 B2 * | 12/2014 | Yang ........................ H02M 1/32 |
| | | 323/282 |
| 2008/0284508 A1 | 11/2008 | Walker |
| 2016/0267833 A1 | 9/2016 | Lee |
| 2022/0329154 A1 | 10/2022 | Xu |

FOREIGN PATENT DOCUMENTS

| CN | 1943099 A | 4/2007 |
| CN | 113014099 A | 6/2021 |
| JP | 6153732 B2 | 6/2017 |
| TW | 201301731 A1 | 1/2013 |
| TW | I571029 B | 2/2017 |
| TW | 201937330 A | 9/2019 |

OTHER PUBLICATIONS

English translation CN 113014099 (Year: 2022).*
Search Report mailed/issued on Jun. 29, 2023 for EP application No. 23151003.3, pp. 1~10, The search result(s) can be found on p. 2 of the document.

* cited by examiner

*Primary Examiner* — Nguyen Tran
(74) *Attorney, Agent, or Firm* — Winston Hsu

(57) ABSTRACT

The present invention provides a circuitry including a regulator and a control circuit is disclosed. The regulator is configured to receive an input signal to generate an output voltage. The control circuit is configured to select one of a first reference voltage and a second reference voltage to serve as an output reference voltage according to an output signal of the regulator, and generate a control signal according to the output reference voltage to control a voltage level of the output voltage of the regulator.

6 Claims, 5 Drawing Sheets

REFERENCE VOLTAGE AUTO-SWITCHING MECHANISM USED IN REGULATOR FOR SAVING MORE POWER IN LOW-POWER MODE

CROSS REFERENCE TO RELATED APPLICATIONS

This application claims the benefit of U.S. Provisional Application No. 63/313,301, filed on Feb. 24, 2022. Further, this application claims the benefit of U.S. Provisional Application No. 63/344,078, filed on May 20, 2022. The contents of these applications are incorporated herein by reference.

BACKGROUND

When an electronic device enters a low-power mode, most of time a regulator of a power management integrated circuit (PMIC) only needs to provide a very small output current for a back-end circuit to use. In order to avoid the regulator being dropped due to a higher step-up loading, the regulator is designed to always provide a higher output voltage to the back-end circuit. However, the higher step-up loading only occurs for a short period of time, such as one millisecond, so always providing high output voltage will cause high power loss.

SUMMARY

It is therefore an objective of the present invention to provide a regulator, which can automatically generate an output voltage with a suitable level according to a loading of the regulator, to solve the above-mentioned problems.

According to one embodiment of the present invention, a circuitry comprising a regulator and a control circuit is disclosed. The regulator is configured to receive an input signal to generate an output voltage. The control circuit is configured to select one of a first reference voltage and a second reference voltage to serve as an output reference voltage according to an output signal of the regulator, and generate a control signal according to the output reference voltage to control a voltage level of the output voltage of the regulator.

According to one embodiment of the present invention, a control method of a regulator disclosed, wherein the regulator is configured to receive an input signal to generate an output voltage. The control method comprises: selecting one of a first reference voltage and a second reference voltage to serve as an output reference voltage according to an output signal of the regulator; and generating a control signal according to the output reference voltage to control a voltage level of the output voltage of the regulator.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular system components. As one skilled in the art will appreciate, manufacturers may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". The terms "couple" and "couples" are intended to mean either an indirect or a direct electrical connection. Thus, if a first device couples to a second device, that connection may be through a direct electrical connection, or through an indirect electrical connection via other devices and connections.

Figure 1:
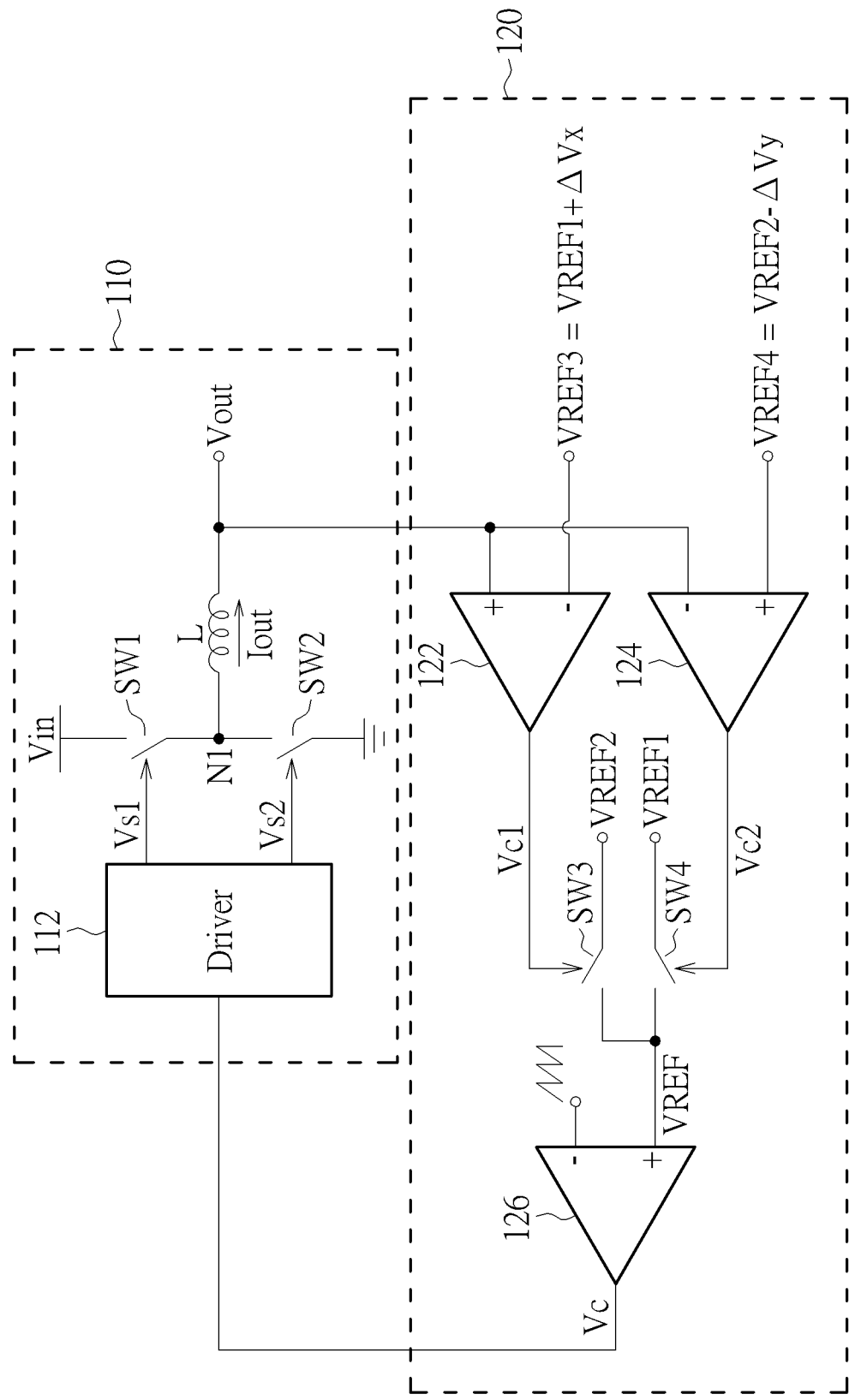
FIG. 1 is a diagram illustrating a circuitry comprising a regulator and a control circuit according to one embodiment of the present invention.

FIG. 1 is a diagram illustrating a circuitry comprising a regulator 110 and a control circuit 120 according to one embodiment of the present invention. As shown in FIG. 1, the regulator 110 is configured to receive an input signal Vin to generate an output voltage Vout, wherein the input signal Vin has a constant voltage level, and the input signal Vin may be obtained from a battery. The regulator 110 comprises a driver 112, a selection circuit comprising two switches SW1 and SW2, and an inductor L, wherein the switch SW1 is coupled between the input signal Vin and a node N1, the switch SW2 is coupled between the node N1 and a ground voltage, and the driver 112 is configured to generate driving signals Vs1 and Vs2 to control the switches SW1 and SW2, respectively. By using the driver 112 to control a duty cycle of the switch SW1/SW2, a voltage level of the output voltage Vout can be determined. It is noted that the circuit structure of the regulator 110 shown in FIG. 1 is for illustrative, not a limitation of the present invention. In other embodiments, the regulator 110 may have any other suitable design.

The regulator 110 may be designed in a PMIC of an electronic device such as a mobile phone, and when the electronic device enters a low-power mode or a sleep mode, the regulator 110 is preferred to provide the output voltage Vout with low voltage level, to decrease power loss. However, because the regulator 110 may suddenly encounter a higher step-up loading, in the conventional art the output voltage Vout should not be designed too low to avoid drop out issue, so that the power loss cannot be effectively decreased. In order to solve this problem, the control circuit 120 is designed to make the regulator 110 generate an output voltage with a suitable level automatically, to save much more power loss.

The control circuit 120 comprises two comparators 122 and 124, two switches SW3 and SW4, and an error amplifier 126. In the operation of the control circuit 120, the comparator 122 is configured to compare the output voltage Vout with a reference voltage VREF3 to generate a control signal Vc1, and the comparator 124 compares the output voltage Vout with a reference voltage VREF to generate a control signal Vc2, wherein the control signal Vc1 is used to control the switch SW3 to generate a reference voltage VREF2 to serve as an output reference voltage VREF, and the control signal Vc2 is used to control the switch SW4 to generate a reference voltage VREF1 to serve as the output reference voltage VREF. In this embodiment, the reference voltage VREF1 is greater than the reference voltage VREF2, for example, the reference voltage VREF1 may be 2V, and the reference voltage VREF2 may be 1.86V; and the reference voltage VREF3 is greater than the reference voltage VREF1, and the reference voltage VREF4 is lower than the reference voltage VREF2, that is VREF3 is equal to "VREF1+$\Delta$Vx", and VREF4 is equal to "VREF2−$\Delta$Vy". In this embodiment, when the output voltage Vout is greater than the reference voltage VREF3, the control signal Vc1 generated by the comparator 122 has a high voltage level to enable the switch SW3, so that the reference voltage VREF2 serves as the output reference voltage VREF; and when the output voltage Vout is lower than the reference VREF3, the control signal Vc1 generated by the comparator 122 has a low voltage level to disable the switch SW3. In addition, when the output voltage Vout is lower than the reference voltage VREF4, the control signal Vc2 generated by the comparator 124 has the high voltage level to enable the switch SW4, so that the reference voltage VREF1 serves as the output reference voltage VREF; and when the output voltage Vout is greater than the reference VREF4, the control signal Vc2 generated by the comparator 124 has the low voltage level to disable the switch SW4.

Then, the error amplifier 126 compares the output reference voltage VREF with a triangular wave to generate a control signal Vc to control the driver 112. Specifically, the control signal Vc is a square wave, and a duty cycle of the control signal Vc is determined based on the voltage level of the output reference voltage VREF. For example, if the output reference voltage VREF has the low voltage level such as VREF2, the control signal Vc has lower duty cycle, and the driver 112 generates the driving signals Vs1 and Vs2 to decrease an enabling period of the switch SW1 and increase the enabling period of the switch SW2 (the switches SW1 and SW2 are not enabled at the same time), to decrease the voltage level of the output voltage Vout. Similarly, if the output reference voltage VREF has the high voltage level such as VREF1, the control signal Vc has greater duty cycle, and the driver 112 generates the driving signals Vs1 and Vs2 to increase an enabling period of the switch SW1 and decrease the enabling period of the switch SW2, to increase the voltage level of the output voltage Vout.

Figure 2:
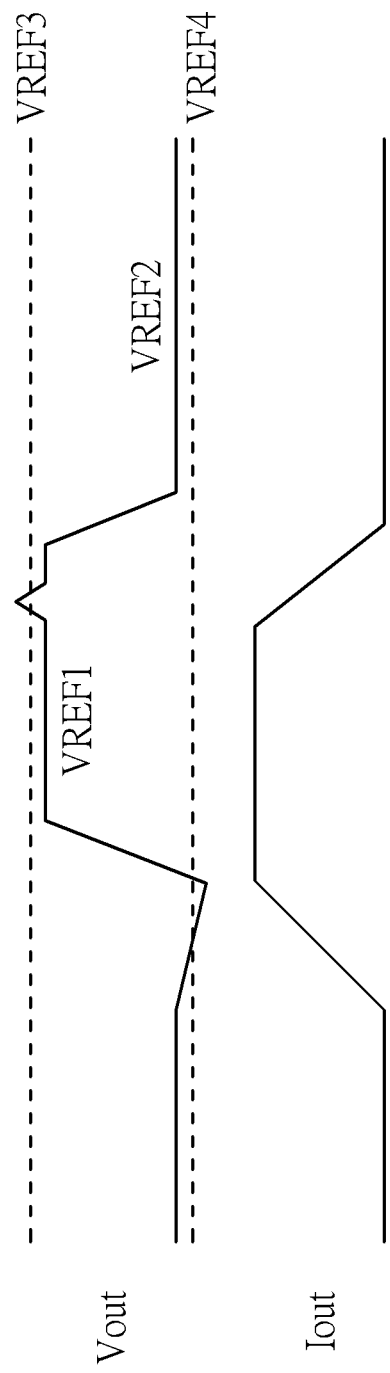
FIG. 2 shows a timing diagram of an output voltage and an output current according to one embodiment of the present invention.

Referring to FIG. 2, by using the embodiment shown in FIG. 1, when the loading increases and an output current Iout increases, if the output voltage Vout is lower than the reference voltage VREF4, the reference voltage VREF1 serves as the output reference voltage VREF for the error amplifier 126 to generate the control signal Vc to control the regulator 110 to increase the voltage level of the output voltage Vout. Then, if the output voltage Vout is greater than the reference voltage VREF3, the reference voltage VREF2 serves as the output reference voltage VREF for the error amplifier 126 to generate the control signal Vc to control the regulator 110 to decrease the voltage level of the output voltage Vout, to lower the power loss. It is noted that, in the embodiment shown in FIG. 2, the output voltage Vout is equal to the reference voltage VREF1 when the reference voltage VREF1 serves as the output reference voltage VREF, and output voltage Vout is equal to the reference voltage VREF2 when the reference voltage VREF2 serves as the output reference voltage VREF, but it's not a limitation of the present invention. That is, as long as the voltage level of the output voltage Vout when the error amplifier 126 using the reference voltage VREF1 is higher than when using the reference voltage VREF2, the output voltage Vout does not have to be equal to the reference voltage VREF1/VREF2.

In the above embodiment, because most of time the regulator 110 has light load, and the higher step-up loading occurs only a short period such as one or two milliseconds, using the control circuit 120 of the present invention can allow the regulator 110 to generate the output voltage Vout with low voltage level most of the time, to effectively decrease the power loss. In addition, because the control circuit 120 can automatically generate the control signal to control the regulator 110 to generate the output voltage with appropriate voltage level, the regulator 410 does not need to receive any indication signal for adjusting the output voltage Vout from the other device when the PMIC operates in the low-power mode, so that the overall design and manufacturing costs of the PMIC can be decreased.

Figure 3:
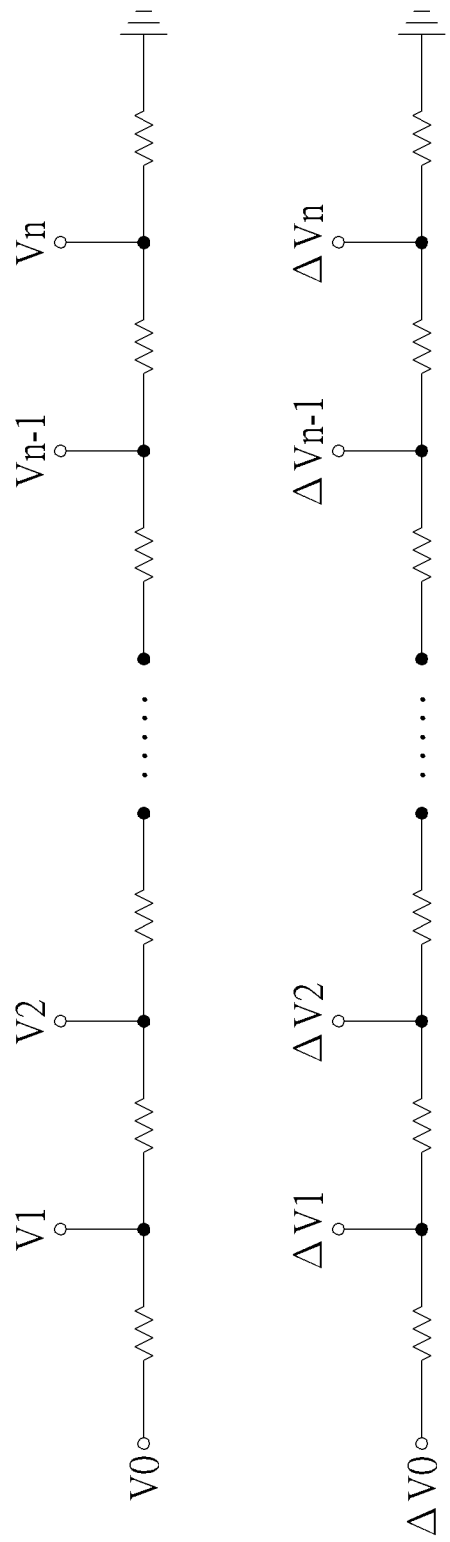
FIG. 3 shows the generation of VREF1, VREF2, $\Delta Vx$ and $\Delta Vy$ according to one embodiment of the present invention.

In one embodiment, VREF1, VREF2, $\Delta$Vx, $\Delta$Vy can be selected from a plurality of voltages. Taking FIG. 3 as an example, a plurality of voltages V1-Vn are generated by using resistors to divide a voltage V0, and a plurality of voltages $\Delta$V1-$\Delta$Vn are generated by using resistors to divide a voltage $\Delta$V0. The reference voltage VREF1 can be selected from the plurality of voltages V1-Vn, the reference voltage VREF2 can be selected from the plurality of voltages V1-Vn, and each of $\Delta$Vx, $\Delta$Vy is selected from the plurality of voltages $\Delta$V1-$\Delta$Vn.

Figure 4:
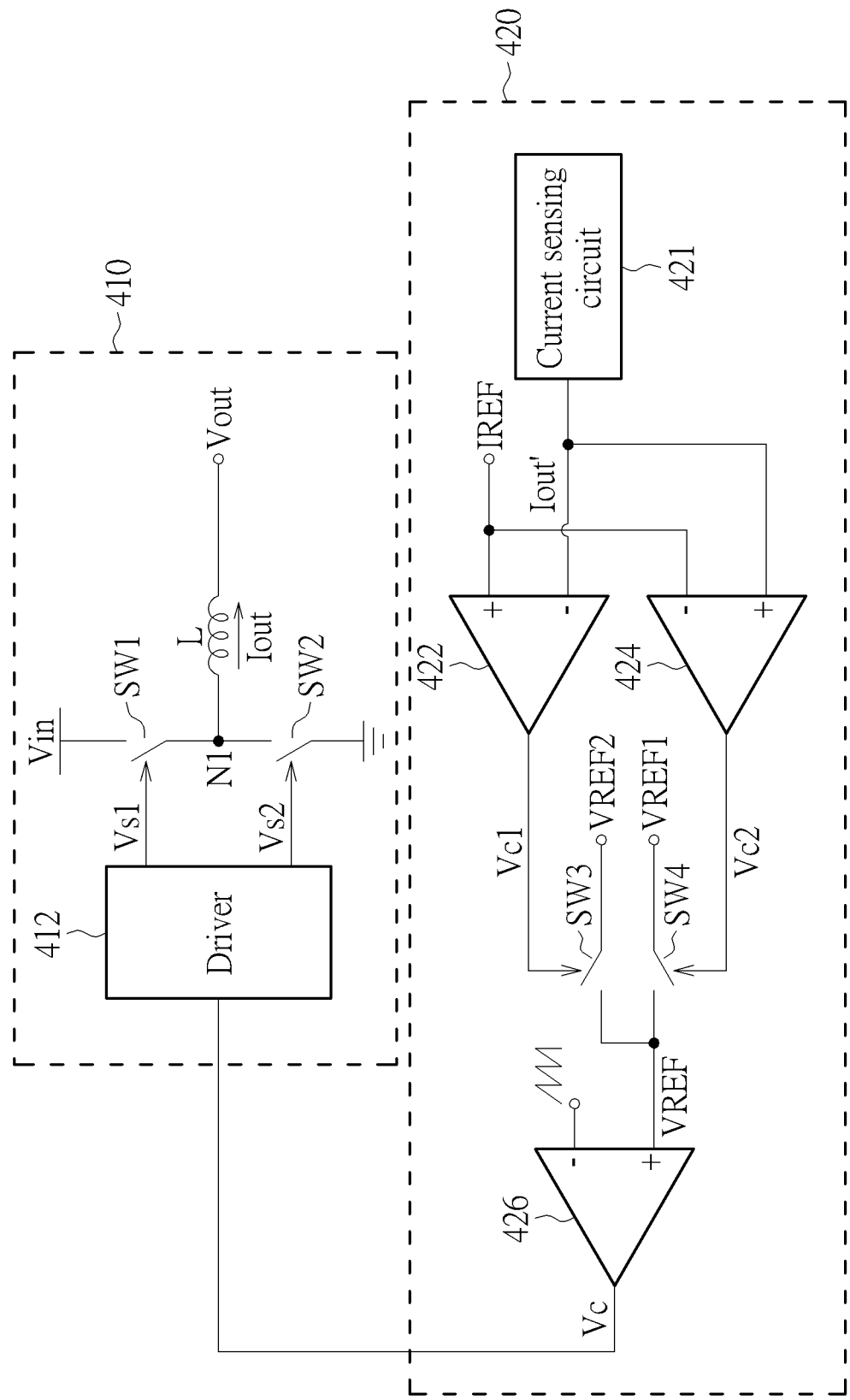
FIG. 4 is a diagram illustrating a circuitry comprising a regulator and a control circuit according to another one embodiment of the present invention.

FIG. 4 is a diagram illustrating a circuitry comprising a regulator 410 and a control circuit 420 according to one embodiment of the present invention. As shown in FIG. 4, the regulator 410 is configured to receive an input signal Vin to generate an output voltage Vout, wherein the input signal Vin has a constant voltage level, and the input signal Vin may be obtained from a battery. The regulator 410 comprises a driver 412, a selection circuit comprising two switches SW1 and SW2, and an inductor L, wherein the switch SW1 is coupled between the input signal Vin and a node N1, the switch SW2 is coupled between the node N1 and a ground voltage, and the driver 412 is configured to generate driving signals Vs1 and Vs2 to control the switches SW1 and SW2, respectively. By using the driver 412 to control a duty cycle of the switch SW1/SW2, a voltage level of the output voltage Vout can be determined. It is noted that the circuit structure of the regulator 410 shown in FIG. 4 is for illustrative, not a limitation of the present invention. In other embodiments, the regulator 410 may have any other suitable design.

The regulator 410 may be designed in a PMIC of an electronic device such as a mobile phone, and when the electronic device enters a low-power mode or a sleep mode, the regulator 410 is preferred to provide the output voltage Vout with low voltage level, to decrease power loss. However, because the regulator 410 may suddenly encounter a higher step-up loading, in the conventional art the output voltage Vout should not be designed too low to avoid drop out issue, so that the power loss cannot be effectively decreased. In order to solve this problem, the control circuit 420 is designed to make the regulator 410 generate an output voltage with a suitable level automatically, to save much more power loss.

The control circuit 420 comprises a current sensing circuit 421, two comparators 422 and 424, two switches SW3 and SW4, and an error amplifier 426. In the operation of the control circuit 420, the current sensing circuit 421 is configured to sense an output current Iout of the regulator 410 to generate a sensed current Iout', wherein the sensed current Iout' is proportional to the output current Iout. In one embodiment, the current sensing circuit 421 may use a current mirror to sense a current flowing into the switch SW1, and estimate the sensed current Iout' by using the current flowing into the switch SW1. In another embodiment, the current sensing circuit 421 may use current mirrors to sense a current flowing into the switch SW1 and a current flowing into the switch SW2, and estimate the sensed current Iout' by using the currents flowing into the switch SW1 and the switch SW2. In yet another embodiment of the present invention, the current sensing circuit 421 may calculate the sensed current Iout' by using a duty cycle of the switch SW1 and the currents flowing into the switch SW1 and the switch SW2. The comparator 422 is configured to compare a reference current IREF with the sensed current Iout' to generate a control signal Vc1, and the comparator 424 compares the sensed current Iout' with a reference current IREF to generate a control signal Vc2, wherein the control signal Vc1 is used to control the switch SW3 to generate a reference voltage VREF2 to serve as an output reference voltage VREF, and the control signal Vc2 is used to control the switch SW4 to generate a reference voltage VREF1 to serve as the output reference voltage VREF. In this embodiment, the reference voltage VREF1 is greater than the reference voltage VREF2, for example, the reference voltage VREF1 may be 2V, and the reference voltage VREF2 may be 1.86V. In this embodiment, when the sensed current Iout' is greater than the reference current IREF, the control signal Vc2 generated by the comparator 424 has a high voltage level to enable the switch SW4, so that the reference voltage VREF1 serves as the output reference voltage VREF; and when the sensed current Iout' is lower than the reference current IREF, the control signal Vc1 generated by the comparator 422 has the high voltage level to enable the switch SW3, so that the reference voltage VREF2 serves as the output reference voltage VREF.

Then, the error amplifier 426 compares the output reference voltage VREF with a triangular wave to generate a control signal Vc to control the driver 412. Specifically, the control signal Vc is a square wave, and a duty cycle of the control signal Vc is determined based on the voltage level of the output reference voltage VREF. For example, if the output reference voltage VREF has the low voltage level such as VREF2, the control signal Vc has lower duty cycle, and the driver 412 generates the driving signals Vs1 and Vs2 to decrease an enabling period of the switch SW1 and increase the enabling period of the switch SW2 (the switches SW1 and SW2 are not enabled at the same time), to decrease the voltage level of the output voltage Vout. Similarly, if the output reference voltage VREF has the high voltage level such as VREF1, the control signal Vc has greater duty cycle, and the driver 412 generates the driving signals Vs1 and Vs2 to increase an enabling period of the switch SW1 and decrease the enabling period of the switch SW2, to increase the voltage level of the output voltage Vout.

Figure 5:
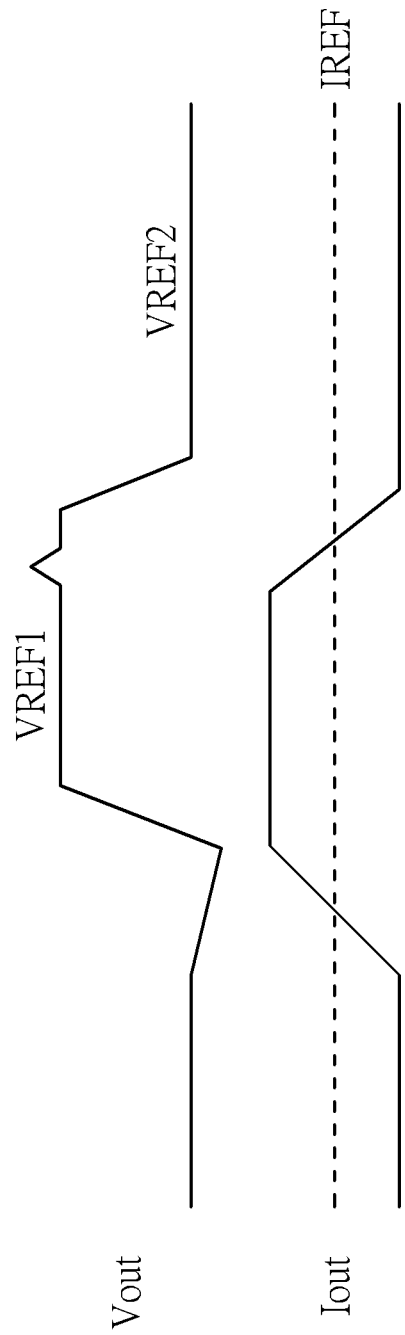
FIG. 5 shows a timing diagram of an output voltage and an output current according to one embodiment of the present invention.

Referring to FIG. 5, by using the embodiment shown in FIG. 4, when the loading increases and the output current Iout increases, if the sensed current Iout' is greater than the reference current IREF, the reference voltage VREF1 serves as the output reference voltage VREF for the error amplifier 426 to generate the control signal Vc to control the regulator 410 to increase the voltage level of the output voltage Vout. Then, when the loading decreases and the output current Iout decreases, if the sensed current Iout' is lower than the reference current IREF, the reference voltage VREF2 serves as the output reference voltage VREF for the error amplifier 426 to generate the control signal Vc to control the regulator 410 to decrease the voltage level of the output voltage Vout, to lower the power loss. It is noted that, in the embodiment shown in FIG. 5, the output voltage Vout is equal to the reference voltage VREF1 when the reference voltage VREF1 serves as the output reference voltage VREF, and output voltage Vout is equal to the reference voltage VREF2 when the reference voltage VREF2 serves as the output reference voltage VREF, but it's not a limitation of the present invention. That is, as long as the voltage level of the output voltage Vout when the error amplifier 426 using the reference voltage VREF1 is higher than when using the reference voltage VREF2, the output voltage Vout does not have to be equal to the reference voltage VREF1/VREF2.

In the above embodiment, because most of time the regulator 410 has light load, and the higher step-up loading occurs only a short period such as one or two milliseconds, using the control circuit 420 of the present invention can allow the regulator 410 to generate the output voltage Vout with low voltage level most of the time, to effectively decrease the power loss. In addition, because the control circuit 420 can automatically generate the control signal to control the regulator 410 to generate the output voltage with appropriate voltage level, the regulator 410 does not need to receive any indication signal for adjusting the output voltage Vout from the other device, so that the overall design and manufacturing costs of the PMIC can be decreased.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A circuitry, comprising:
a regulator, configured to receive an input signal to generate an output voltage;
a control circuit, coupled to the regulator, configured to select one of a first reference voltage and a second reference voltage to serve as an output reference voltage according to an output signal of the regulator, and generate a control signal according to the output reference voltage to control a voltage level of the output voltage of the regulator;
wherein the output signal is the output voltage, and the control circuit comprises:
a first comparator, configured to compare the output voltage with a third reference voltage to generate a first control signal;
a second comparator, configured to compare the output voltage with a fourth reference voltage to generate a second control signal;
a selection circuit, configured to select one of the first reference voltage and the second reference voltage to serve as the output reference voltage according to the first control signal and the second control signal;
wherein the first reference voltage is greater than the second reference voltage, and the third reference voltage is greater than the fourth reference voltage; and when the output voltage is greater than the third reference voltage, the first comparator generates the first control signal to control the selection circuit to select the second reference voltage as the output reference voltage; and when the output voltage is lower than the fourth reference voltage, the second comparator generates the second control signal to control the selection circuit to select the first reference voltage as the output reference voltage.

2. The circuitry of claim 1, wherein the third reference voltage is greater than the first reference voltage, and the fourth reference voltage is lower than the second reference voltage.

3. The circuitry of claim 1, wherein the selection circuit comprises a first switch and a second switch, the first switch is configured to output the second reference voltage to serve as the output reference voltage, and the second switch is configured to output the first reference voltage to serve as the output reference voltage; and when the when the output voltage is greater than the third reference voltage, the first comparator generates the first control signal to enable the first switch to output the second reference voltage to serve as the output reference voltage, and the second comparator generates the second control signal to disable the second switch; and when the when the output voltage is lower than the fourth reference voltage, the first comparator generates the first control signal to disable the first switch, and the second comparator generates the second control signal to enable the second switch to output the first reference voltage to serve as the output reference voltage.

4. The circuitry of claim 1, wherein each of the first reference voltage is selected from a plurality of voltages.

5. A circuitry, comprising:
   a regulator, configured to receive an input signal to generate an output voltage;
   a control circuit, coupled to the regulator, configured to select one of a first reference voltage and a second reference voltage to serve as an output reference voltage according to an output signal of the regulator, and generate a control signal according to the output reference voltage to control a voltage level of the output voltage of the regulator;
   wherein the output signal is the output voltage, and the control circuit comprises:
   a first comparator, configured to compare the output voltage with a third reference voltage to generate a first control signal;
   a second comparator, configured to compare the output voltage with a fourth reference voltage to generate a second control signal;
   a selection circuit, configured to select one of the first reference voltage and the second reference voltage to serve as the output reference voltage according to the first control signal and the second control signal;
   wherein the control circuit further comprises:
   an error amplifier, coupled to the selection circuit, configured to compare the output reference voltage with a triangular wave to generate the control signal to control the regulator.

6. A control method of a regulator, wherein the regulator is configured to receive an input signal to generate an output voltage, and the control method comprises:
   selecting one of a first reference voltage and a second reference voltage to serve as an output reference voltage according to an output signal of the regulator; and
   generating a control signal according to the output reference voltage to control a voltage level of the output voltage of the regulator;
   wherein the output signal is the output voltage, and the step of selecting one of the first reference voltage and the second reference voltage to serve as the output reference voltage according to the output signal of the regulator comprises:
   comparing the output voltage with a third reference voltage to generate a first control signal;
   comparing the output voltage with a fourth reference voltage to generate a second control signal;
   selecting one of the first reference voltage and the second reference voltage to serve as the output reference voltage according to the first control signal and the second control signal;
   wherein the first reference voltage is greater than the second reference voltage, and the third reference voltage is greater than the fourth reference voltage; and the step of selecting one of the first reference voltage and the second reference voltage to serve as the output reference voltage according to the first control signal and the second control signal comprises:
   when the output voltage is greater than the third reference voltage, selecting the second reference voltage as the output reference voltage; and
   when the output voltage is lower than the fourth reference voltage, selecting the first reference voltage as the output reference voltage.

* * * * *